US 6,735,342 B2

(12) United States Patent
Felts et al.

(10) Patent No.: US 6,735,342 B2
(45) Date of Patent: May 11, 2004

(54) VIDEO ENCODING METHOD USING A WAVELET TRANSFORM

(75) Inventors: Boris Felts, Marseille (FR); Beatrice Pesquet-Popescu, Fontenay-sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 625 days.

(21) Appl. No.: 09/821,131

(22) Filed: Mar. 29, 2001

(65) Prior Publication Data

US 2001/0046326 A1 Nov. 29, 2001

(30) Foreign Application Priority Data

Apr. 4, 2000 (EP) .............................. 00400932

(51) Int. Cl.$^7$ .............................. G06K 9/36; G06K 9/46
(52) U.S. Cl. ................... 382/240; 375/240.19
(58) Field of Search .............................. 382/232, 236, 382/240, 248; 375/240.19; 348/398.1, 408.1, 412.1, 415.1, 437.1, 438.1; 341/79

(56) References Cited

U.S. PATENT DOCUMENTS 5,563,960 A * 10/1996 Shapiro ...................... 382/239
6,289,131 B1 * 9/2001 Ishikawa .................... 382/240

OTHER PUBLICATIONS

Cai et al., A new SPIHT algorithm based on variable sorting thresholds, May 6–9, 2001, The 2001 IEEE International Symposiu on Circuits and Systems, vol. 5, pp. 231–234.*
Roh et al., A new set partitioning method for wavelet based image coding, Oct. 4–7, 1998, 1998 International Conference on Image Processing, 1998. ICIP 98. Proceedings. vol. 1, pp. 102–106.*

Kim et al., An embedded wavelet video coder using three–dimensional set partitioning in hierarchical trees (SPIHT), Mar. 25–27, 1997, Data Compression Conference, 1997, DCC '97, Proceedings., pp. 251–260.*
Ssay Song Goh, "Displacements in Wavelet Decomposition of Images", Feb. 1994, (Abstract).
MarceloJ. Weinberger, "A Universal Finite Memory Source", May 1995, (Abstract).
Amir Said, "A New, Fast, And Efficient Image Codec Based On Set Partitioning in Hierarchical Trees", Jun. 1996, (Abstract).
Frans M. J. Willems, "The Context–Tree Weighting Method: Basic Properties", May 1995, (Abstract).

* cited by examiner

Primary Examiner—Timothy M. Johnson (57) ABSTRACT

The invention relates to an encoding method for the compression of a video sequence divided in flames decomposed by means of a wavelet transform. Said method, based on the hierarchical subband encoding process called "set partitioning in hierarchical trees" (SPIHT), leads from the original set of picture elements of the video sequence to wavelet transform coefficients encoded with a binary format. These coefficients are organized in trees and ordered into partitioning sets respectively corresponding to levels of significance, by means of magnitude tests leading to a classification into three ordered lists called list of insignificant sets (LIS), list of insignificant pixels (LIP) and list of significant pixels (LSP). According to the invention, a specific initialization order of the LIS is proposed. Moreover, the orientation trees defining the relationship in the hierarchical pyramid of the wavelet decomposition are explored from the lowest resolution level to the highest one, while keeping neighboring pixels together and taking account of the orientation of the details.

6 Claims, 5 Drawing Sheets

VIDEO ENCODING METHOD USING A WAVELET TRANSFORM

BACKGROUND OF THE INVENTION

1. Field of the Invention

The present invention relates to an encoding method for the compression of a video sequence divided, in frames or groups of frames decomposed by means of a wavelet transform leading to a given number of successive resolution levels that correspond to the decomposition levels of said transform, said encoding method being based on the hierarchical subband encoding process called "set partitioning in hierarchical trees" (SPIHT) and leading from the original set of picture elements of the video sequence to wavelet transform coefficients encoded with a binary format, said coefficients being organized in trees and ordered into partitioning sets corresponding to respective levels of significance, said sets being defined by means of magnitude tests leading to a classification of the significance information in three ordered lists called list of insignificant sets (LIS), list of insignificant pixels (LIP) and list of significant pixels (LSP), and said tests being carried out in order to divide said original set of picture elements into said partitioning sets according to a division process that continues until each significant coefficient is encoded within said binary representation.

2. Description of the Related Art

Classical video compression schemes may be considered as comprising four main modules: motion estimation and compensation, transformation in coefficients (for instance, discrete cosine transform or wavelet decomposition), quantification and encoding of the coefficients, and entropy coding. When a video encoder has moreover to be scalable, this means that it must be able to encode images from low to high bit rates, increasing the quality of the video with the rate. By naturally providing a hierarchical representation of images, a transform by means of a wavelet decomposition appears to be more adapted to scalable schemes than the conventional discrete cosine transform (DCT).

A wavelet decomposition allows an original input signal to be described by a set of subband signals. Each subband represents in fact the original signal at a given resolution level and in a particular frequency range. This decomposition into uncorrelated subbands is generally implemented by means of a set of monodimensional filter banks applied first to the lines of the current image and then to the columns of the resulting filtered image. An example of such an implementation is described in "Displacements in wavelet decomposition of images", by S. S. Goh, Signal Processing, vol. 44, n°1, June 1995, pp.27–38. Practically two filters—a low-pass one and a high-pass one—are used to separate low and high frequencies of the image. This operation is first carried out on the lines and followed by a sub-sampling operation, by a factor of 2, and then carried out on the columns of the sub-sampled image, the resulting image being also down-sampled by 2. Four images, four times smaller than the original one, are thus obtained: a low-frequency sub-image (or "smoothed image"), which includes the major part of the initial content of the concerned original image and therefore represents an approximation of said image, and three high-frequency sub-images, which contain only horizontal, vertical and diagonal details of said original image. This decomposition process continues until it is clear that there is no more useful information to be derived from the last smoothed image.

A technique rather computationally simple for image compression, using a two-dimensional (2D) wavelet decomposition, is described in "A new, fast, and efficient image codec based on set partitioning in hierarchical trees (=SPIHT)", by A. Said and W. A. Pearlman, IEEE Transactions on Circuits and Systems for Video Technology, vol.6, n°3, June 1996, pp.243–250, As explained in said document, the original image is supposed to be defined by a set of pixel values $p(x,y)$, where x and y are the pixel coordinates, and coded by a hierarchical subband transformation, represented by the following formula (1):

$$c(x,y)=\Omega(p(x,y)) \quad (1)$$

where $\Omega$ represents the transformation and each element $c(x,y)$ is called "transform coefficient for the pixel coordinates (x,y)".

The major objective is then to select the most important information to be transmitted first, which leads to order these transform coefficients according to their magnitude (coefficients; with larger magnitude have a larger content of information and should be transmitted first, or at least their most significant bits). If the ordering information is explicitly transmitted to the decoder, images with a rather good quality can be recovered as soon as a relatively small fraction of the pixel coordinates are transmitted. If the ordering information is not explicitly transmitted, it is then supposed that the execution path of the coding algorithm is defined by the results of comparisons on its branching points, and that the decoder, having the same sorting algorithm, can duplicate this execution path of the encoder if it receives the results of the magnitude comparisons. The ordering information can then be recovered from the execution path.

One important fact in said sorting algorithm is that it is not necessary to sort all coefficients, but only the coefficients such that $2^n \leq |c_{x,y}| < 2^{n+1}$, with n decremented in each pass. Given n, if $|c_{x,y}| \geq 2^n$ (n being called the level of significance), it is said that a coefficient is significant; otherwise it is called insignificant. The sorting algorithm divides the set of pixels into partitioning subsets $T_m$ and performs the magnitude test (2):

$$\max_{(x,y) \in T_m} \{|c_{x,y}|\} \geq 2^n \ ? \quad (2)$$

If the decoder receives a "no" (the whole concerned subset is insignificant), then it knows that all coefficients in this subset $T_m$ are insignificant. If the answer is "yes" (the subset is significant), then a predetermined rule shared by the encoder and the decoder is used to partition $T_m$ into new subsets $T_{m,l}$, the significance test being further applied to these new subsets. This set division process continues until the magnitude test is done to all single coordinate significant subsets in order to identify each significant coefficient and to allow to encode it with a binary format.

To reduce the number of transmitted magnitude comparisons (i.e. of message bits), one may define a set partitioning rule that uses an expected ordering in the hierarchy defined by the subband pyramid. The objective is to create new partitions such that subsets expected to be insignificant contain a large number of elements, and subsets expected to be significant contain only one element. To make clear the relationship between magnitude comparisons and message bits, the following function is used:

$$S_n(T) = \begin{cases} 1, & \max_{(x,y)\in T}\{|c_{x,y}|\} \geq 2^n, \\ 0, & \text{otherwise,} \end{cases} \quad (3)$$

to indicate the significance of a subset of coordinates T.

Figures 1, 6:
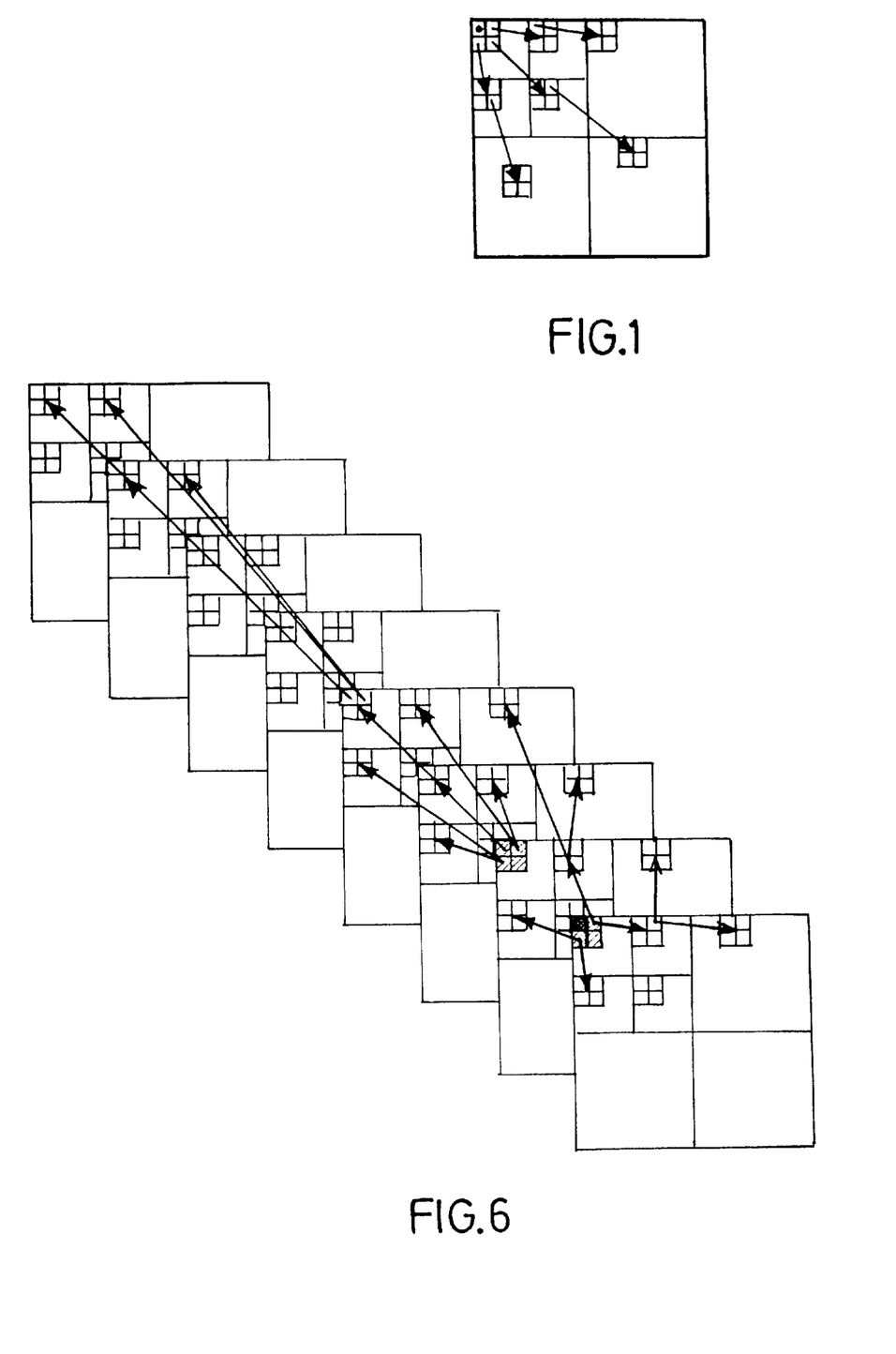
FIG. 1 illustrates examples of parent-offspring dependencies in the spatial orientation tree in the 2D case.
FIG. 6 shows examples of parent-offspring dependencies in the spatio-temporal orientation tree (3D SPIHT)

Furthermore, it has been observed that there is a spatial self-similarity between subbands. The coefficients are expected to be better magnitude-ordered if one moves downward in the pyramid following the same spatial orientation. For instance, if low-activity areas are expected to be identified in the highest levels of the pyramid, then they are replicated in the lower levels at the same spatial locations, but with a higher resolution. A tree structure, called spatial orientation tree, naturally defines the spatial relationship in the hierarchical subband pyramid of the wavelet decomposition. FIG. 1 shows how the spatial orientation tree is defined in a pyramid constructed with recursive four-subband splitting. Each node of the tree corresponds to the pixels of the same spatial orientation in the way that each node has either no offspring (the leaves) or four offspring, which always form a group of 2×2 adjacent pixels. In FIG. 1, the arrows are oriented from the parent node to its offspring. The pixels in the highest level of the pyramid are the tree roots and are grouped in 2×2 adjacent pixels. However, their offspring branching rule is different, and in each group, one of them (indicated by the dot in FIG. 1) has no descendant.

The following sets of coordinates are used to present this coding method, (x,y) representing the location of the coefficient:

O(x,y): set of coordinates of all offspring of node (x,y);

D(x,y): set of coordinates of all descendants of the node (x,y);

H: set of coordinates of all spatial orientation tree roots (nodes in the highest pyramid level);

$L(x,y)=D(x,y)-O(x,y).$

As it has been observed that the order in which the subsets are tested for significance is important, in a practical implementation the significance information is stored in three ordered lists, called list of insignificant sets (LIS), list of insignificant pixels (LIP), and list of significant pixels (LSP). In all these lists, each entry is identified by coordinates (x,y), which in the LIP and LSP represent individual pixels, and in the LIS represent either the set D(x,y) or L(x,y) (to differentiate between them, a LIS entry may be said of type A if it represents D(x,y), and of type B if it represents L(x,y)). The SPIHT algorithm is in fact based on the manipulation of the three lists LIS, LIP and LSP.

For the entropy coding module, the arithmetic coding technique is more effective in video compression than the Huffmann encoding owing to the following reasons: the obtained codelength is very close to the optimal length, the method particularly suits adaptive models (the statistics of the source are estimated on the fly), and it can be split into two independent modules (the modeling one and the coding one). The following description relates mainly to modeling, which involves the determination of certain source-string events and their context, and the way to estimate their related statistics.

The context is intended to capture the redundancies of the entire set of source strings under consideration. In an original video sequence, the value of a pixel indeed depends on those of the pixels surrounding it. After the wavelet decomposition, the same property of "geographic" interdependency holds in each subband. If the coefficients are sent in an order that preserves these dependencies, it is possible to take advantage of the "geographic" information in the framework of universal coding of bounded memory tree sources, as described for instance in the document "A universal finite memory source", by M. J. Weinberger and al., IEEE Transactions on Information Theory, vol.41, n°3, May 1995, pp.643–652. A finite memory tree source has the property that the next symbol probabilities depend on the actual values of the most recent symbols. Binary sequential universal source coding procedures for finite memory tree sources often make use of context tree which contains for each string (context) the number of occurrences of zeros and ones given the considered context. This tree allows to estimate the probability of a symbol, given the d previous bits:

$\hat{P}(X_n|x_{n-1}\ldots x_{n-d})$, where $x_n$ is the value of the examined bit and $x_{n-1}\ldots x_{n-d}$ represents the context, i.e. the previous sequence of d bits. This estimation turns out to be a difficult task when the number of conditioning events increases because of the context dilution problem or the model cost.

One way to solve this problem is the context-tree weighting method, detailed in "The context-tree weighting method: basic properties", by F. M. J. Willems and al., IEEE Transactions on Information Theory, vol.41, n°3, May 1995, pp.653–664. The principle of this method is to estimate weighted probabilities using the most efficient context for the examined bit. Indeed, sometimes it can be better to use shorter contexts to encode a bit (if the last bits of the context have no influence on the current bit, they might not be taken into account). This technique reduces the length of the final code. The determination of efficient models and contexts is therefore a crucial stage in arithmetic encoding.

The 2D SPIHT algorithm, which mainly consists in comparing a set of pixels corresponding to the same image area at different resolutions to the value previously called "level of significance", is based on a key concept: the prediction of the absence of significant information across scales of the wavelet decomposition by exploiting self-similarity inherent in natural images. This means that if a coefficient is insignificant at the lowest scale of wavelet decomposition, the coefficients corresponding to the same area at the other scales have great chances to be insignificant too. Unfortunately, the SPIHT algorithm, which exploits the redundancy between the subbands, "destroys" the dependencies between neighboring pixels inside each subband.

SUMMARY OF THE INVENTION

It is therefore a first object of the present invention to improve the scanning order in the SPITH algorithm in order to reestablish the relations of neighborhood between pixels of the same subband.

Figure 7:
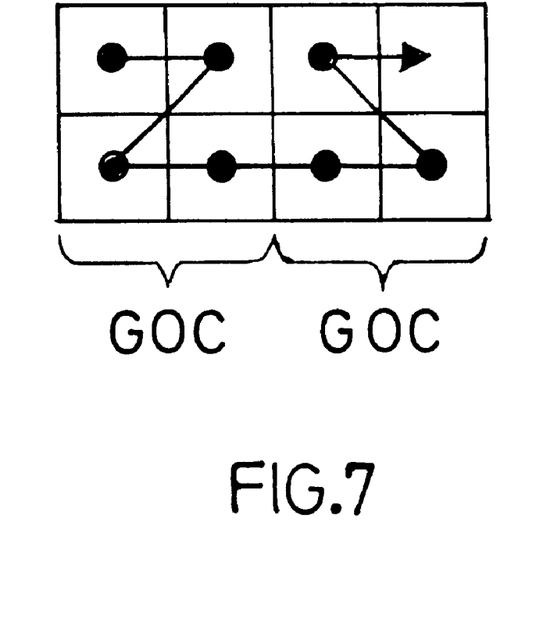
FIG. 7 describes the proposed scanning order for a group of 4 offspring and the passage from one group to the next one in the horizontal direction (subbands with details having an horizontal or diagonal direction)
Figure 8:
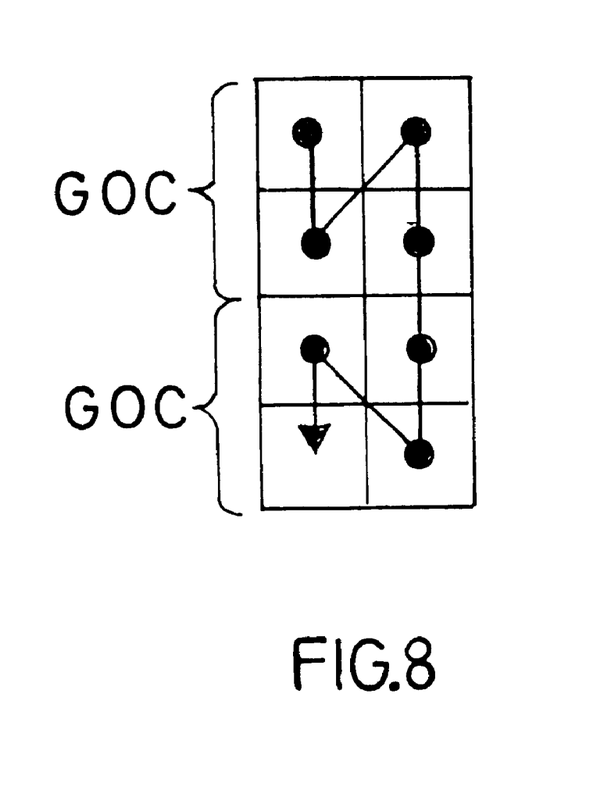
FIG. 8 describes the proposed scanning order for a group of 4 offspring and the passage from one group to the next one in the vertical direction (subbands with details having a vertical direction)
Figure 9:
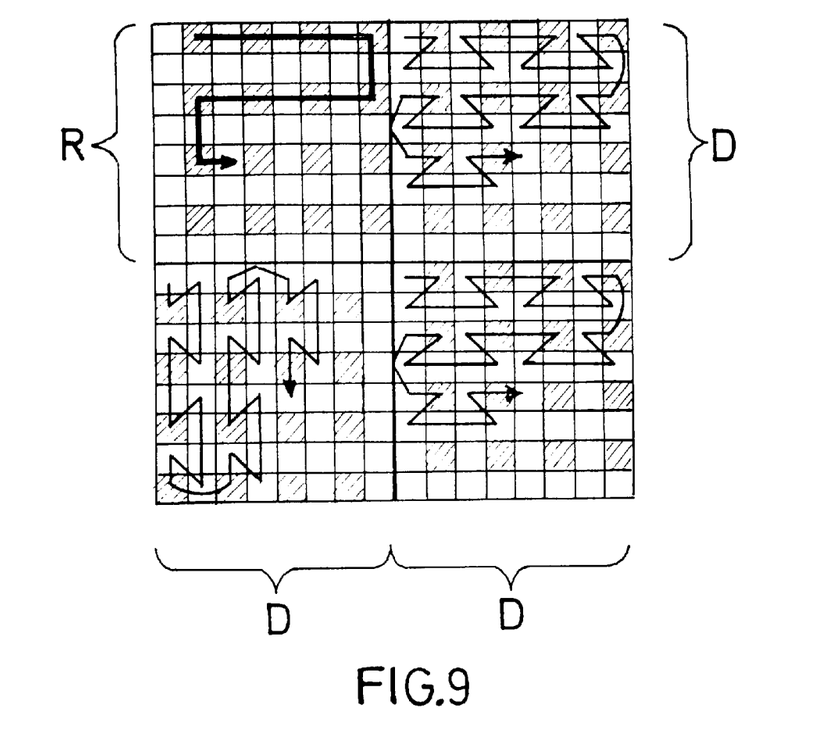
FIG. 9 shows the order of scanning for the coefficients of the lowest resolution subbands.
Figure 10:
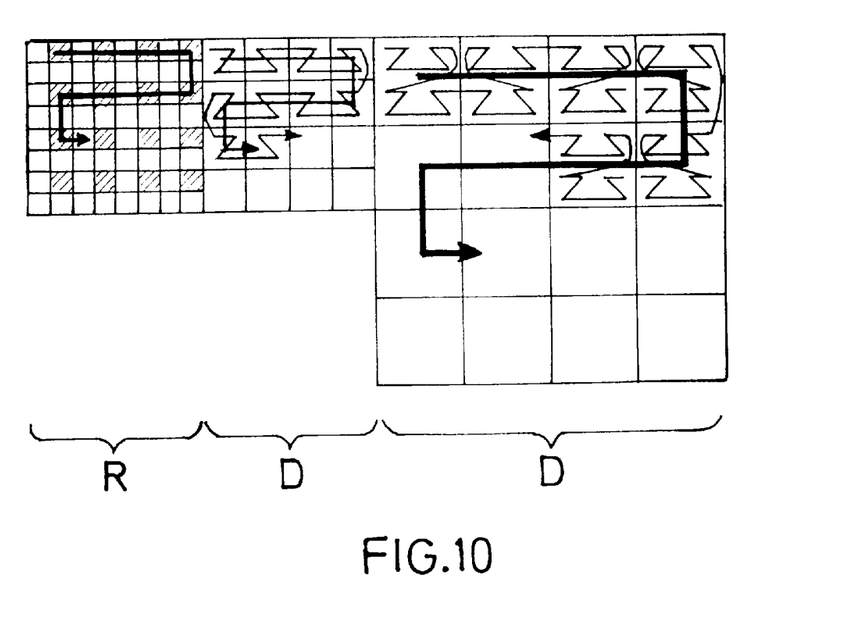
FIG. 10 illustrates the scanning order over two resolution levels for subbands with horizontal orientation of details (a special attention is given to passages from one group of pixels to the other, by respecting the proximity of pixels).

To this end, the invention relates to an encoding method for the compression of a video sequence including successive frames, each frame being decomposed by means of a two dimensional (2D) wavelet transform leading to a given number of successive resolution levels corresponding to the decomposition levels of said transform, said encoding method being based on the hierarchical subband encoding process called "set partitioning in hierarchical trees" (SPIHT) and leading from the original set of picture elements of the video sequence to wavelet transform coefficients encoded with a binary format, said coefficients being organized into spatial orientation trees rooted in the lowest frequency, or spatial approximation, subband and completed by an offspring in the higher frequency subbands, the coefficients of said trees being further ordered into partitioning sets corresponding to respective levels of significance and defined by means of magnitude tests leading to a classification of the significance information in three ordered lists called list of insignificant sets (LIS), list of insignificant pixels (LIP) and list of significant pixels (LSP), said tests being carried out in order to divide said original set of picture elements into said partitioning sets according to a division process that continues until each significant coefficient is encoded within said binary representation, said method being further characterized in that it comprises the following steps:

(A) an initialization step, in which, each pixel having coordinates (x,y) varying from 0 to size__x and from 0 to size__y respectively, said list LIS is then initialized with the coefficients of said spatial approximation subband, excepting the coefficient having the coordinates x=0(mod 2) and y=0(mod 2), the initialization order of the LIS being the following:

(a) put in the list all the pixels that verify x=1(mod.2) and y=0(mod.2), for the luminance component Y and then for the chrominance components U and V;

(b) put in the list all the pixels that verify x=1(mod.2) and y=1(mod.2), for Y and then for U and V;

(c) put in the list all the pixels that verify x=0(mod.2) and y=1(mod.2), for Y and then for U and V;

(B) an exploration step, in which the spatial orientation trees defining the spatial relationship in the hierarchical subband pyramid of the wavelet decomposition are explored from the lowest resolution level to the highest one, while keeping neighboring pixels together and taking account of the orientation of the details, said exploration of the offspring coefficients being implemented thanks to a zig-zag scanning order of the offspring coefficients that is shown in FIG. 7, in the case of horizontal and diagonal detail subbands, for a group of four offspring and the passage of said group to the next one in the horizontal direction, in FIG. 8 for a group of four offspring and the passage of said group to the next one in the vertical direction, and in FIGS. 9 and 10 respectively for the lowest resolution level and for the finer resolution levels.

It is another object of the invention to implement a similar principle in the case of a 3D SPIHT algorithm.

To this end, the invention relates to an encoding method for the compression of a video sequence including successive groups of frames, each group of frames being decomposed by means of a three-dimensional (3D) wavelet transform leading to a given number of successive resolution levels corresponding to the decomposition levels of said transform, said encoding method being based on the hierarchical subband encoding process called "set partitioning in hierarchical trees" (SPIHT) and leading from the original set of picture elements of the video sequence to wavelet transform coefficients encoded with a binary format, said coefficients being organized into spatio-temporal orientation trees rooted in the lowest frequency, or spatio-temporal approximation, subband and completed by an offspring in the higher frequency subbands, the coefficients of said trees being further ordered into partitioning sets corresponding to respective levels of significance and defined by means of magnitude tests leading to a classification of the significance information in three ordered lists called list of insignificant sets (LIS), list of insignificant pixels (LIP) and list of significant pixels (LSP), said tests being carried out in order to divide said original set of picture elements into said partitioning sets according to a division process that continues until each significant coefficient is encoded within said binary representation, said method being further characterized in that it comprises the following steps:

(A) an initialization step, in which the spatio-temporal approximation subband that results from the 3D wavelet transform contains the spatial approximation subbands of the two frames in the temporal approximation subband, indexed by z=0 and z=1, and, each pixel having coordinates (x,y,z) varying for x and y from 0 to size__x and from 0 to size__y respectively, said list LIS is then initialized with the coefficients of said spatio-temporal approximation subband, excepting the coefficient having the coordinates of the form z=0(mod 2), x=0(mod 2) and y=0(mod 2), the initialization order of the LIS being the following:

(a) put in the list all the pixels that verify x=0(mod.2) and y=0(mod.2) and z=1, for the luminance component Y and then for the chrominance components U and V;

(b) put in the list all the pixels that verify x=1(mod.2) and y=0(mod.2) and z=0, for Y and then for U and V;

(c) put in the list all the pixels that verify x=1(mod.2) and y=1(mod.2) and z=0, for Y and then for U and V;

(d) put in the list all the pixels that verify x=0(mod.2) and y=1(mod.2) and z=0, for Y and then for U and V;

(B) an exploration step, in which the spatio-temporal orientation trees defining the spatio-temporal relationship in the hierarchical subband pyramid of the wavelet decomposition are explored from the lowest resolution level to the highest one, while keeping neighboring pixels together and taking account of the orientation of the details, said exploration of the offspring coefficients being implemented thanks to a scanning order of the offspring coefficients that is shown in FIG. 7, in the case of horizontal and diagonal detail subbands, for a group of four offspring and the passage of said group to the next one in the horizontal direction, in FIG. 8 for a group of four offspring and the passage of said group to the next one in the vertical direction, and in FIGS. 9 and 10 respectively for the lowest resolution level and for the finer resolution levels.

The initialization of the LIS plays an important role in the progress of the algorithm. A special organization of this list, a particular scan of offspring coefficients and slight modifications of the original algorithm allow to explore the trees in depth while keeping neighboring pixels together and taking account of the orientation of the details.

BRIEF DESCRIPTION OF THE DRAWINGS

The invention will now be described in a more detailed manner, with reference to the accompanying drawings in which.

DETAILED DESCRIPTION OF THE INVENTION

It has been seen that a main challenge in the efficient insertion of the arithmetic coding into the SPIHT algorithm is to keep the geographic neighboring in the contexts. The initial organization of the LIS and a particular order of reading the offspring will allow to re-establish partially a geographic scan of the coefficients, as explained first for the 2D SPIHT algorithm restricted to luminance coefficients, and then, as an extension, in the case of the 3D SPIHT algorithm with chrominance components.

The 2D SPIHT algorithm scans the pixels of all the spatial subbands using the parent-offspring dependencies, starting with the coefficients of the root subband that are originally stored in the LIP (and a part of them also in the LIS). By ordering differently the roots of the spatial offspring trees, it is possible to re-establish a coherent order for the examination of the higher subbands one after another, and even to take into account the spatial orientation of the details (the orientation of the details may be indeed better exploited when considering a privileged direction of scanning).

Figure 2:
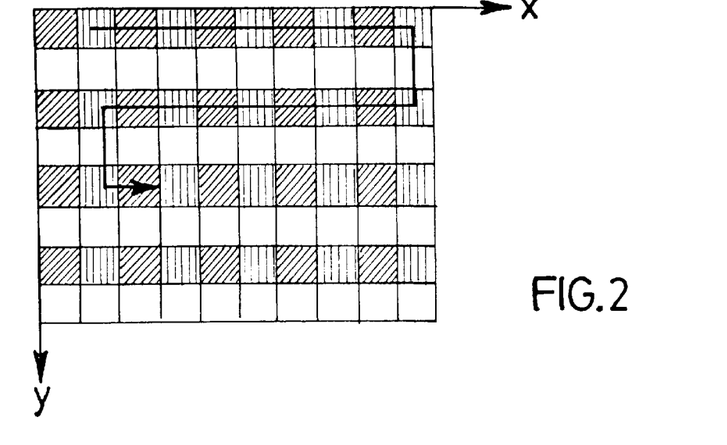
FIG. 2 shows the proposed scanning order of the root subband coefficients having offspring in the horizontal detail subbands.
Figure 3:
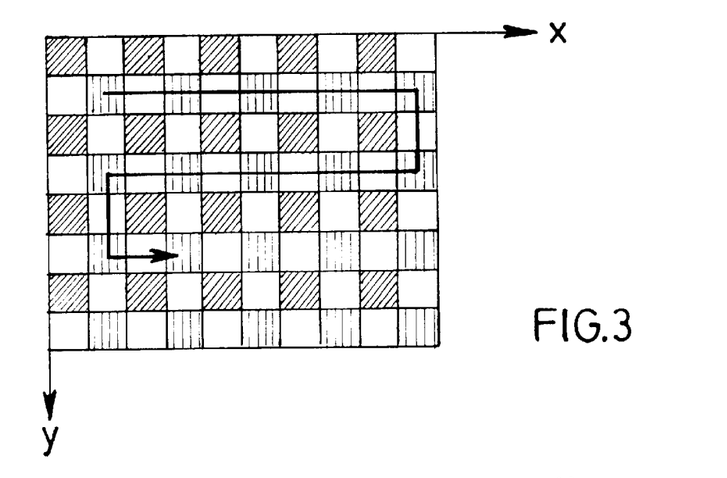
FIG. 3 shows the proposed scanning order of the root subband coefficients having offspring in the diagonal detail subbands.
Figure 4:
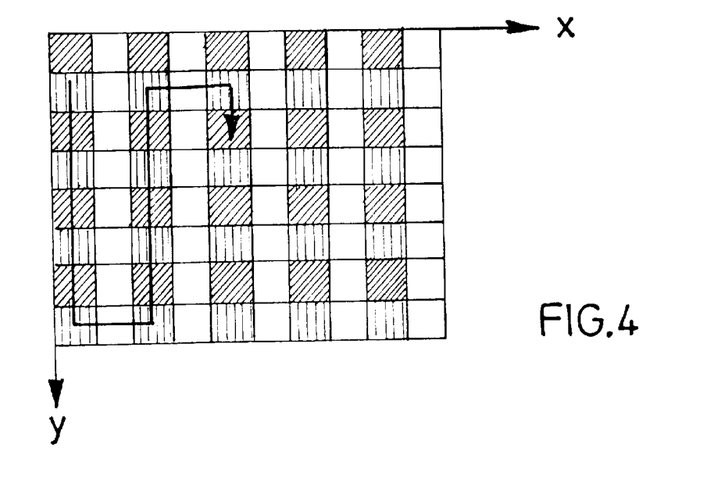
FIG. 4 shows the proposed scanning order of the root subband coefficients having offspring in the vertical detail subbands.
Figure 5:
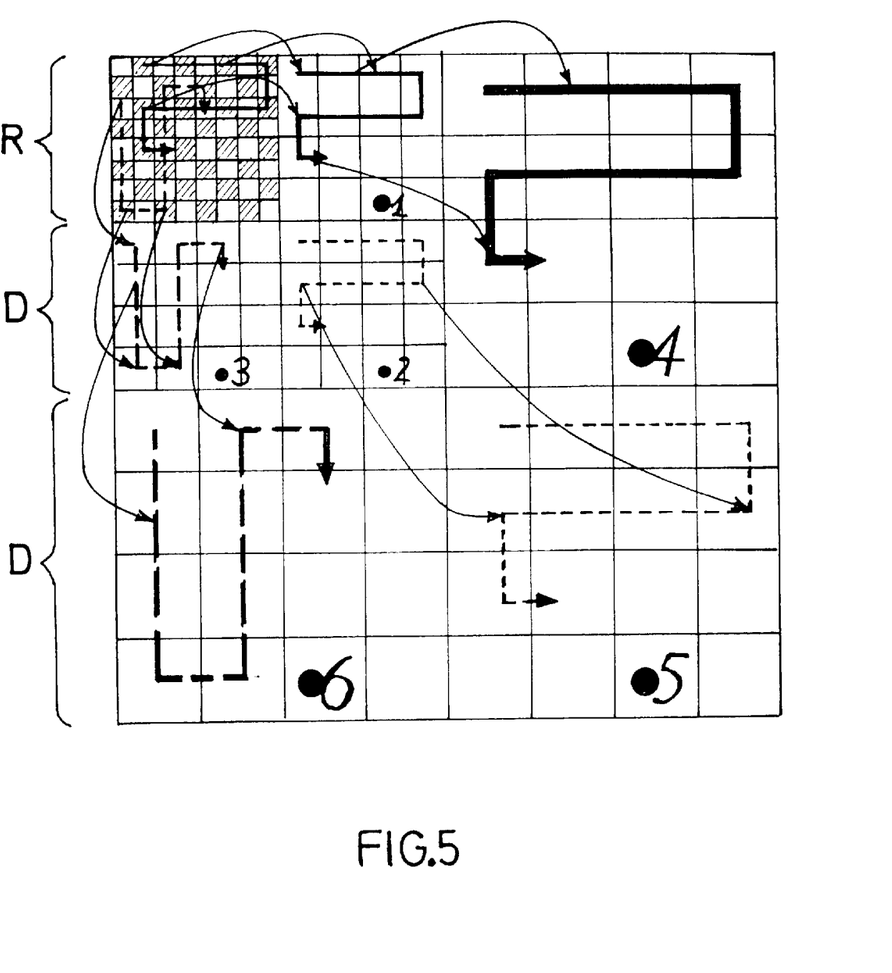
FIG. 5 illustrates the organized and oriented scan in the detail subbands.

It is therefore proposed to initialize the LIS with the coefficients of the approximation subband (a pixel has coordinates (x,y) with x varying from 0 to size_x and y varying from 0 to size_y) using the following scanning:

(a) put in the list all the pixels (x,y) that verify x=1(mod.2) and y=0(mod.2), by horizontally scanning the subband (this first case corresponds to FIG. 2);

(b) put in the list all the pixels (x,y) that verify x=1 (mod.2) and y=1(mod.2), by horizontally scanning the subband (this second case corresponds to FIG. 3);

(c) put in the list all the pixels (x,y) that verify x=0(mod.2) and y=1(mod.2), by vertically scanning the subband, which corresponds to the third case of FIG. 4 (the pixels (x,y) that verify x=0(mod.2) and y=0(mod.2) are not inserted in the LIS). Thanks to this organization of the LIS, the 2D SPIHT algorithm scans the subbands following a prescribed order of examination of the details: the subbands containing the horizontal details are first read, then the subbands containing the diagonal details (for which the order is not so important), and finally the subbands containing the vertical details, from the lowest resolution to the highest one as illustrated in FIG. 5 (R=root; D=detail).

The technical solution according to the invention may be extended to the three-dimensional case. The 3D SPIHT algorithm, described for instance in "An embedded wavelet video coder using three-dimensional set partitioning in hierarchical trees (SPIHT)", by B. J. Kim and W. A. Pearlman, Proceedings of DCC'97, Mar. 25–27, 1997, Snowbird, Utah, USA, pp.251–260, does not differ greatly from the two-dimensional previous one. A 3D-wavelet decomposition is performed on a group of frames (GOF). Following the temporal direction, a motion compensation and a temporal filtering are realized. Instead of spatial sets (2D), one has 3D spatio-temporal sets, and trees of coefficients having the same spatio-temporal orientation and being related by parent-offspring relationships can be also defined. These links are illustrated in the 3D case in FIG. 6. The roots of the trees are formed with the pixels of the approximation subband at the lowest resolution ("root" subband). In the 3D SPIHT algorithm, in all the subbands but the leaves, each pixel has 8 offspring pixels, and mutually, each pixel has only one parent. There is one exception at this rule: in the root case, one pixel out of 8 has no offspring.

As in the 2D case, a spatio-temporal orientation tree naturally defines the spatio-temporal relationship in the hierarchical wavelet decomposition, and the following sets of coordinates are used:

O(x,y,z chroma): set of coordinates of all offspring of node (x,y,z chroma);

D(x,y,z chroma): set of coordinates of all descendants of the node (x,y,z chroma);

H(x,y,z chroma): set of coordinates of all spatio-temporal orientation tree roots (nodes in the highest pyramid level);

L(x,y,z, chroma)=D(x,y,z, chroma)−O(x,y,z, chroma);

where (x,y,z) represents the location of the coefficient and "chroma" stands for Y, U or V. There are three ordered lists: LIS (list of insignificant sets), LIP (list of insignificant pixels), LSP (list of significant pixels). In all these lists, each entry is identified by a coordinate (x,y,z, chroma), which in the LIP and LSP represents individual pixels, and in the LIS represents one of D(x,y,z, chroma) or L(x,y,z, chroma) sets. To differentiate between them, the LIS entry is of type A if it represents D(x,y,z, chroma), and of type B if it represents L(x,y,z, chroma). As previously in the 2D case, the algorithm 3D SPIHT is based on the manipulation of these three lists LIS, LIP and LSP.

The 3D extension of the solution according to the invention is done without any particular initialization on the temporal axis. The temporal approximation subband has two frames, indexed by z=0 and z=1, and the proposed initialization order is now the following:

(a) put in the list all the pixels that verify x=0(mod.2) and y=0(mod.2) and z=1, for the luminance component Y and then for the chrominance components U and V;

(b) put in the list all the pixels that verify x=1(mod.2) and y=0(mod.2) and y=0(mod.2) and z=1, for Y and then for U and V;

(c) put in the list all the pixels that verify x=1(mod.2) and y=1(mod.2) and z=0, for Y and then for U and V;

(d) put in the list all the pixels that verify x=0(mod.2) and y=1 (mod.2) and z=0, for Y and then for U and V.

The scanning order is vertical in the case (d) and horizontal in the other ones.

The second main aspect of the method consists in a different order of examination of the offspring coefficients. The general rule is that the order of scanning follows the orientation of the details in each subband. This increases the probability of having large running of ones or zeros, which can be easily compressed by the arithmetic encoder. At each resolution level, two groups of 4 offspring coefficients (or groups of children, designated by GOC in the figures) are scanned as depicted in FIG. 7 for the horizontal and diagonal detail subbands and as depicted in FIG. 8 for vertical detail subbands. An example of scanning at the lowest resolution level is illustrated in FIG. 9, that describes the scanning order at the pixel level. Pixels are scanned by groups of four, and the passage from one group to the other is illustrated in FIG. 6 (for this passage, the orientation of the details in each subband is followed again (see points 1, 2, 3). For the finer resolution levels, the scanning order respects the "geographic" proximity, that is, as more as possible, no jump from one line to the other is authorized. Instead, the scanning order proposed in FIG. 10 is implemented. The scanning order for groups of four pixels is the same as before. The passage from one group to the other is illustrated in FIG. 10 and, at the group level, in FIG. 6 (point 4, 5, and 6).

It must be noted that, with respect to the described encoding method, modifications or improvements may be proposed without departing from the scope of the invention. For instance, it is clear that this coding method can be implemented by means of wired electronic circuits or, alternatively, by means of a set of instructions stored in an electronic, magnetic or optical computer-readable medium, or any other type of memory, said instructions replacing at least part of said circuits and being executable under the control of a suitable computer, digital processor, central processing unit, application-specific integrated circuit or any other type of processor in order to carry out the same functions as fulfilled in said replaced circuits. The invention then also relates to such a computer-readable medium, comprising a software module that includes compute-executable instructions for performing the steps, or some steps, of the described method.

With respect to the coding algorithm and the associated software described in the document "A new, fast, and efficient image codec . . . " cited above, an algorithm modified according to the invention may be, for instance in the 3D case, the following one:
1. Initialization:
output $n = \lfloor \log_2(\max_{(x,y,z,chroma)}\{|C_{x,y,z,chroma}|\}) \rfloor$, set the LSP as an empty list, and add the coordinates (x,y,z, chroma) $\in$ H to the LIP, and only those with descendants also to the LIS, as type A entries, following the predefined order.
2. Sorting Pass:
2.1 For each entry (x,y,z,chroma) in the LIP, do:
2.1.1 output bit=$S_n$(x,y,z,chroma);
2.1.2 if (bit=1), then:
move (x,y,z,chroma) to the LSP and output bit=sign(x,y,z,chroma);
2.2 For each entry (x,y,z,chroma) in the LIS, do:
2.2.1 if the entry is of type A, then:
output bit=$S_n$(D(x,y,z,chroma));
if (bit=1), then:
a) for each (x', y', z', chroma)$\in$O(x,y,z, chroma), do:
output bit=$S_n$(x',y',z',chroma);
if (bit=1), then:
move (x',y',z',chroma) to the end of LSP and output bit=sign(x',y',z',chroma);
else
move (x',y',z',chroma) to the end of the LIP;
b) if L(x,y,z, chroma)$\neq$0, then move (x,y,z, chroma) to the end of the LIS as an entry of type B, and go to step 2.2.2, else remove entry (x,y,z, chroma) from the LIS;
2.2.2 if the entry is of type B, then:
output bit=$S_n$(L(x,y,z, chroma));
if (bit=1), then:
a) add each (x',y',z',chroma)$\in$ O(x,y,z, chroma) to the end of the LIS as an entry of type A;
b) remove (x,y,z chroma) from the LIS.
3. Refinement Pass:
For each entry (x,y,z, chroma) in the LSP, except those included in the last sorting pass (i.e., with same n), output the $n^{th}$ most significant bit of $c_{(x,y,z,chroma)}$;
4. Quantization-step Update: Decrement n by 1 and Go to Step 2.

What is claimed is:

1. An encoding method for the compression of a video sequence including successive frames, each frame being decomposed by means of a two dimensional (2D) wavelet transform leading to a given number of successive resolution levels corresponding to the decomposition levels of said transform, said encoding method being based on the hierarchical subband encoding process called "set partitioning in hierarchical trees" (SPIHT) and leading from the original set of picture elements of the video sequence to wavelet transform coefficients encoded with a binary representation, said coefficients being organized into spatial orientation trees rooted in the lowest frequency, or spatial approximation, subband and completed by an offspring in the higher frequency subbands, the coefficients of said trees being further ordered into partitioning sets corresponding to respective levels of significance and defined by means of magnitude tests leading to a classification of the significance information in three ordered lists called list of insignificant sets (LIS), list of insignificant pixels (LIP) and list of significant pixels (LSP), said tests being carried out in order to divide said original set of picture elements into said partitioning sets according to a division process that continues until each significant coefficient is encoded within said binary representation, said method being further characterized in that it comprises the following steps:
(A) an initialization step, in which, each pixel having coordinates (x,y) varying from 0 to size__x and from 0 to size__y respectively, said list LIS is then initialized with the coefficients of said spatial approximation subband, excepting the coefficient having the coordinates x=0(mod 2) and y=0(mod 2), the initialization order of the LIS being the following:
(a) put in the list all the pixels that verify x=1(mod 2) and y=0(mod 2), for the luminance component Y and then for the chrominance components U and V;
(b) put in the list all the pixels that verify x=1(mod 2) and y=1(mod 2), for Y and then for U and V;
(c) put in the list all the pixels that verify x=0(mod 2) and y=1(mod 2), for Y and then for U and V;
(B) an exploration step, in which the spatial orientation trees defining the spatial relationship in the hierarchical subband of the wavelet decomposition are explored from the lowest resolution level to the highest one, while keeping neighboring pixels together and taking account of the orientation of the details, said exploration of the offspring coefficients being implemented based on a zig-zag scanning order of the offspring coefficients in the case of horizontal and diagonal detail subbands, for a group of four offspring and passage of said group to the next subband in the horizontal direction, for a group of four offspring and passage of said group to the next subband in the vertical direction, and respectively for the lowest resolution level and for the finer resolution levels.

2. An encoding method for the compression of a video sequence including successive groups of frames, each group of frames being decomposed by means of a three-dimensional (3D) wavelet transform leading to a given number of successive resolution levels corresponding to the decomposition levels of said transform, said encoding method being based on the hierarchical subband encoding process called "set partitioning in hierarchical trees" (SPIHT) and leading from the original set of picture elements of the video sequence to wavelet transform coefficients encoded with a binary representation, said coefficients being organized into spatio-temporal orientation trees rooted in the lowest frequency, or spatio-temporal approximation, subband and completed by an offspring in the higher frequency subbands, the coefficients of said trees being further ordered into partitioning sets corresponding to respective levels of significance and defined by means of magnitude tests leading to a classification of the significance information in three ordered lists called list of insignificant sets (LIS), list of insignificant pixels (LIP) and list of significant pixels (LSP), said tests being carried out in order to divide said original set of picture elements into said partitioning sets according to a division process that continues until each significant coefficient is encoded within said binary representation, said method being further characterized in that it comprises the following steps:

(A) an initialization step, in which the spatio-temporal approximation subband that results from the 3D wavelet transform contains spatial approximation subbands of two frames in a temporal approximation subband, indexed by z=0 and z=1, and, each pixel having coordinates (x,y,z) varying for x and y from 0 to size_x and from 0 to size_y respectively, said list LIS is then initialized with the coefficients of said spatio-temporal approximation subband, excepting the coefficient having coordinates of the form z=0(mod 2), x=0(mod 2) and y=0(mod 2), the initialization order of the LIS being the following:

(a) put in the list all the pixels that verify x=0(mod 2) and y=0(mod 2) and z=1, for the luminance component Y and then for the chrominance components U and V;

(b) put in the list all the pixels that verify x=1(mod 2) and y=0(mod 2) and z=0, for Y and then for U and V;

(c) put in the list all the pixels that verify x=1(mod 2) and y=1(mod 2) and z=0, for Y and then for U and V;

(d) put in the list all the pixels that verify x=0(mod 2) and y=1(mod 2) and z=0, for Y and then for U and V;

(B) an exploration step, in which the spatio-temporal orientation trees defining the spatio-temporal relationship in the hierarchical subband of the wavelet decomposition are explored from the lowest resolution level to the highest one, while keeping neighboring pixels together and taking account of the orientation of the details, said exploration of the offspring coefficients being implemented based on a scanning order of the offspring coefficients in the case of horizontal and diagonal detail subbands, for a group of four offspring and passage of said group to the next subband in the horizontal direction, for a group of four offspring and passage of said group to the next subband in the vertical direction, and respectively for the lowest resolution level and for the finer resolution levels.

3. Computer executable process steps provided to encode a video sequence including successive frames, said process steps being stored on a computer-readable medium and being provided in order to carry out an encoding method according to claim 1.

4. A computer-readable medium containing one or more software programs provided in order to carry out an encoding method according to claim 1.

5. Computer-executable process steps provided to encode a video sequence including successive frames, said process steps being stored on a computer-readable medium and being provided in order to carry out an encoding method according to claim 2.

6. A computer-readable medium containing one or more software programs provided in order to carry out an encoding method according to claim 2.

* * * * *